(12) United States Patent
Kojima et al.

(10) Patent No.: US 6,561,656 B1
(45) Date of Patent: May 13, 2003

(54) ILLUMINATION OPTICAL SYSTEM WITH REFLECTING LIGHT VALVE

(75) Inventors: Kuniko Kojima, Tokyo (JP); Shinji Okamori, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/067,280

(22) Filed: Feb. 7, 2002

(30) Foreign Application Priority Data

Sep. 17, 2001 (JP) ........................................ 2001-281489

(51) Int. Cl.⁷ .............................................. G02B 27/18
(52) U.S. Cl. ............................................. 353/98; 353/20
(58) Field of Search .......................... 353/20, 38, 31, 353/34, 37, 102, 101, 98; 349/5, 8, 9; 348/742, 743, 771

(56) References Cited

U.S. PATENT DOCUMENTS 6,005,722 A * 12/1999 Butterworth et al. ....... 359/712
6,322,219 B1 * 11/2001 Okamori et al. ............. 353/98
6,412,954 B1 * 7/2002 Wang ........................... 353/98
6,443,576 B1 * 9/2002 Nishida et al. ............... 353/98
6,461,001 B2 * 10/2002 Okamori et al. ............ 353/102

FOREIGN PATENT DOCUMENTS

JP    2000-241755    9/2000

* cited by examiner

*Primary Examiner*—William Dowling
(74) *Attorney, Agent, or Firm*—Birch, Stewart, Kolasch & Birch, LLP (57) ABSTRACT

An illumination optical system comprises a light source lamp (1), a light mixing element (3) for mixing light emitted from the light source lamp (1), a DMD element (5) having a plurality of pixels, a transmission optical system (4) for bringing a light-exit surface (3a) of the light mixing element (3) into optical conjugation with a to-be-illuminated surface (5S) of the DMD element (5), and a field lens (6) located in front of the DMD element (5). The focal length of the field lens (6) can be changed so that an illuminance distribution that varies according to the application of the illumination optical system can be achieved on the to-be-illuminated surface (5S).

11 Claims, 11 Drawing Sheets

| Edmd1 | | | | Edmd2 |
|---|---|---|---|---|
| | | | | |
| | | Cdmd | | |
| | | | | |
| Edmd3 | | | | Edmd4 |

<PRIOR ART>

ILLUMINATION OPTICAL SYSTEM WITH REFLECTING LIGHT VALVE

BACKGROUND OF THE INVENTION

1. Field of the Invention

The present invention relates to an illumination optical system using a reflecting light valve such as a digital micromirror device (referred to as "DMD" hereinafter) or a reflecting liquid crystal display. It also relates to a projection display (e.g., projector) including the illumination optical system.

2. Description of the Background Art

Figure 14:
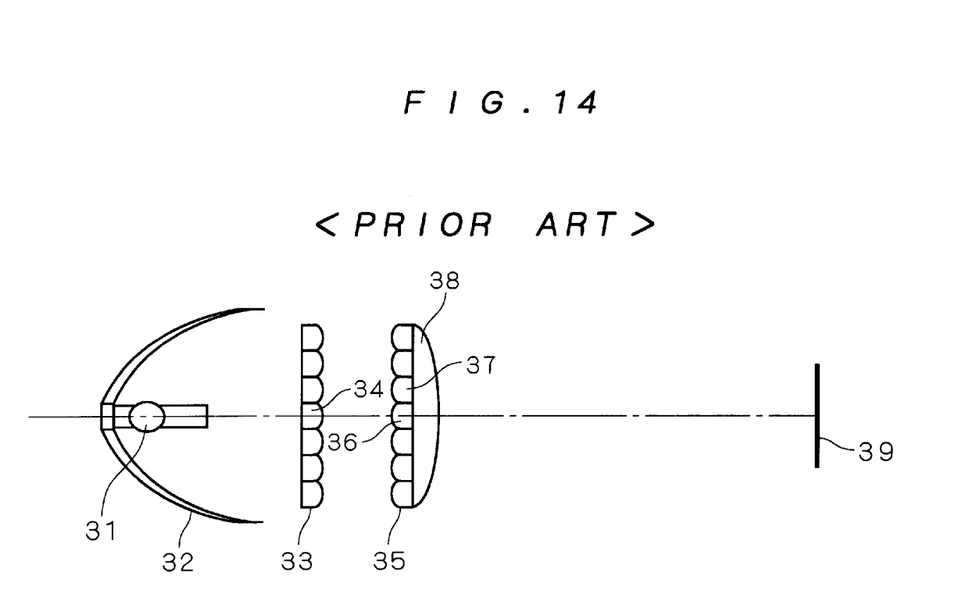
FIG. 14 schematically shows the details of a conventional projection display.

FIG. 14 is a schematic diagram of an illumination optical system applied to a conventional projection display disclosed in Japanese Patent Application Laid-open No. 2000-241755. In FIG. 14, reference numeral 31 designates a light source and reference numeral 32 designates a parabolic mirror that reflects light from the light source 31 and makes the reflected light generally parallel to an optical axis of illumination. Reference numeral 33 designates a first lens array, reference numeral 34 designates a convex lens constituting the first lens array 33, reference numeral 35 designates a second lens array, and reference numerals 36 and 37 designate convex lenses constituting the second lens array 35. Further, reference numeral 38 designates a collective lens and reference numeral 39 designates a to-be-illuminated surface.

Light emitted from the light source 31 and then reflected by the parabolic mirror 32 is generally made parallel; however, in the open end of the parabolic mirror 32, the light intensity distribution in the periphery is higher than that in the center because of the influences of optical properties of the light source 31 such as light emission and light distribution. The illumination optical system of FIG. 14 has the functions of reducing such a deviation of the illumination light distribution and illuminating the central portion of the to-be-illuminated surface more brightly than the peripheral portion. Now, the operation of the illumination optical system in FIG. 14 will be briefly described.

The first lens array 33 is formed of an array of a plurality of convex lenses 34 having the same focal length. The second lens array 35, on the other hand, is formed of an array of alternate convex lenses 36 and 37 having two different focal lengths. The focal length of the convex lenses 36 is determined so as to adjust, in combination with the condenser lens 38, the focus of their corresponding convex lenses 34 in the first lens array 33 on the to-be-illuminated surface 39. From this, light passing through half of the convex lenses 34 in the first lens array 33 is superimposed on the to-be-illuminated surface 39, and even if the light intensity distribution in the open end of the parabolic mirror 32 is not uniform, the to-be-illuminated surface 39 can be provided with a uniform illuminance distribution.

The focal length of the convex lenses 37, on the other hand, is determined to be greater than that of the convex lenses 36; therefore, even in combination with the condenser lens 38, the focus of their corresponding convex lenses 34 in the first lens array 33 cannot be adjusted on the to-be-illuminated surface 39. That is, light passing through the convex lenses 37 has a convexly curved illuminance distribution on the to-be-illuminated surface 39, with the central portion being higher in illuminance than the peripheral portion.

As above described, the illuminance distribution on the to-be-illuminated surface 39 is formed by a combination of (i) the uniform illuminance distribution of the light passing through the convex lenses 36 and (ii) the convexly curved illuminance distribution of the light passing through the convex lenses 37. That is, the illuminance distribution on the to-be-illuminated surface 39 gently changes within an effective illuminated area on the to-be-illuminated surface 39, with the central portion being higher in illuminance than the peripheral portion. This achieves a projection display capable of making improvement on uniform illumination that is not suitable for TV image display, for example.

In the above conventional projection display illustrated in FIG. 14, however, the light passing through the convex lenses 37, which account for one half of the total lenses in the second lens array 35, is not focused on the to-be-illuminated surface 39. Accordingly, a light source image to be formed on the pupil of a projection lens (not shown) is out of focus as well. Considering efficiency of light utilization, the light source image on the pupil should be in sharp focus. From this, the conventional projection display in FIG. 14 has a problem that the positive provision of the convex lenses 37 causes defocusing as above described, thereby resulting in unavoidable energy loss.

SUMMARY OF THE INVENTION

A first aspect of the present invention is directed to an illumination optical system comprising: a light source; a light mixing element mixing light emitted from the light source; a reflecting light valve having a plurality of pixels; a transmission optical system located between the light mixing element and the reflecting light valve and bringing a light exit surface of the light mixing element into optical conjugation with a to-be-illuminated surface of the reflecting light valve; and a field lens located between the transmission optical system and the reflecting light valve, wherein a focal length of the field lens is determined so that an illuminance distribution which varies according to the application of the illumination optical system can be achieved on the to-be-illuminated surface.

According to a second aspect of the present invention, in the illumination optical system of the first aspect, the focal length of the field lens is determined so that an illumination margin takes on a value in the neighborhood of 1.0, and a diagonal dimension of a to-be-illuminated area on the to-be-illuminated surface is equivalent to the product of a diagonal dimension of the to-be-illuminated surface and the illumination margin.

According to a third aspect of the present invention, in the illumination optical system of the first aspect, the focal length of the field lens is determined by obtaining at least one of a radius of curvature of the field lens and the type of a glass material forming the field lens on the basis of the illuminance distribution which varies according to the application of the illumination optical system.

According to a fourth aspect of the present invention, in the illumination optical system of the first aspect, the light exit surface of the light mixing element and the to-be-illuminated surface of the reflecting light valve are generally similar in shape.

According to a fifth aspect of the present invention, in the illumination optical system of the first aspect, the plurality of pixels in the reflecting light valve each are configured of a micromirror having a variable angle of inclination.

According to a sixth aspect of the present invention, in the illumination optical system of the first aspect, the light mixing element is formed in the shape of a hollow rod, using its inner surface as a reflecting surface.

According to a seventh aspect of the present invention, the illumination optical system of the first aspect further comprises: a rotary color filter located either in front of or behind the light mixing element to pass the light emitted from the light source.

According to an eighth aspect of the present invention, in the illumination optical system of the first aspect, the field lens is a planoconvex lens having a plane surface on the side of the to-be-illuminated surface of the reflecting light valve.

According to a ninth aspect of the present invention, in the illumination optical system of the first aspect, the field lens has at least one aspherical surface.

According to a tenth aspect of the present invention, in the illumination optical system of the first aspect, the field lens is a Fresnel lens.

An eleventh aspect of the present invention is directed to a projection display comprising: the illumination optical system of the first aspect; a screen; and a projection lens system located between the reflecting light valve and the screen.

The first, second, and eleventh aspects of the present invention can achieve the effect of, by simply changing the focal length of the field lens located in front of the reflecting light valve, easily achieving various illuminance distributions depending on applications of the illumination optical system on the reflecting light valve, without reducing the efficiency of light utilization.

The third aspect of the present invention can achieve the effect of, by simply replacing the field lens, achieving different illuminance distributions on the reflecting light valve without giving any change to the optical elements other than the field lens and to the structural members holding the optical elements.

The fourth aspect of the present invention can achieve the effect of allowing easy design of the light mixing element and minimized optical losses.

The fifth aspect of the present invention can achieve the effect of providing a low-cost, light-efficient device.

The sixth aspect of the present invention can achieve the effect of simplifying the ways of cooling and holding the light mixing element.

The seventh aspect of the present invention can achieve the effect of providing a compact, light-efficient device.

The eighth aspect of the present invention can achieve the effect of facilitating the settings of the relative positions of the field lens and the reflecting light valve.

The ninth and tenth aspects of the present invention can achieve the effect of achieving high image performance while correcting high-order off-axis aberration such as distortion, coma, and astigmatism.

The present invention has been made in view of the aforementioned conventional problems and an object thereof is to achieve, on a reflecting light valve, various illuminance distributions depending on applications of the illumination optical system or projection display, while improving the efficiency of light utilization without energy loss. More specifically, the principal object of the present invention is to achieve (i) a uniform illuminance distribution on a to-be-illuminated surface of the reflecting light valve and conversely (ii) a non-uniform illuminance distribution on the to-be-illuminated surface of the reflecting light valve.

These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

Figure 1:
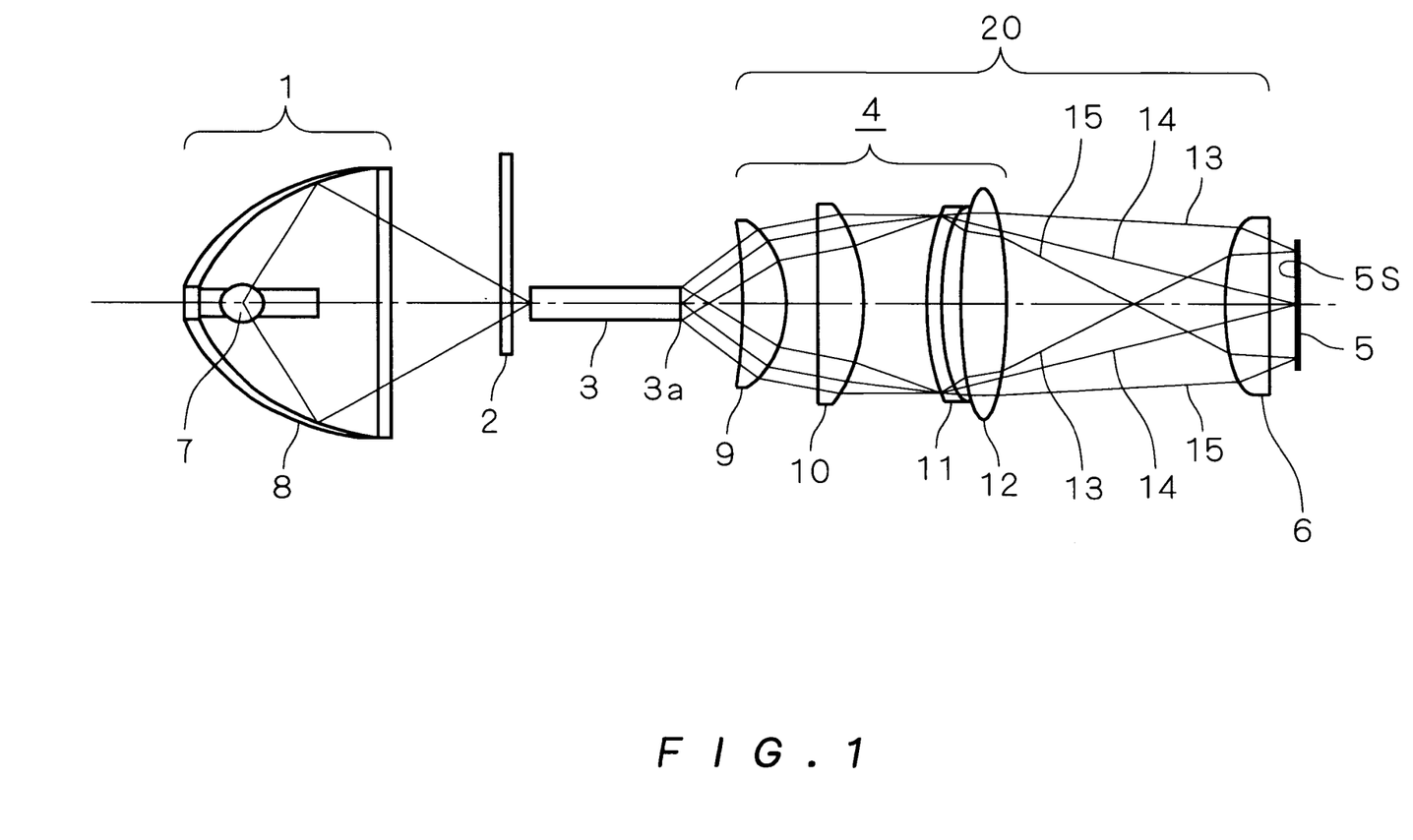
FIG. 1 shows a configuration of an illumination optical system according to a first preferred embodiment.

FIG. 1 schematically shows a configuration of an illumination optical system according to this preferred embodiment.

The illumination optical system of this preferred embodiment comprises a light source lamp 1, a rotary color filter 2 passing light emitted from the light source lamp 1, a light mixing element 3 in the shape of a square rod for mixing light passing through the rotary color filter 2, a transmission optical system 4 for transmitting light emitted from the light mixing element 3, a DMD element (reflecting light valve) 5 having a plurality of pixels, and a lens element 6 located between the transmission optical system 4 and the DMD element 5 and closer to the DMD element 5.

Especially in this illumination optical system, the focal length of the lens element 6 is determined so as to achieve, on the DMD element 5, a required illuminance distribution that varies depending on applications of the illumination optical system or projection display (e.g., for illumination of a multi-screen or for illumination of a single screen). In this way, a required illuminance distribution depending on the application can be achieved by simply changing only the focal length of the lens element 6 in accordance with the application, or in other words, by replacing the lens element 6 with another lens element of a desired focal length in accordance with the application. The lens element 6 has little influence on conjugate in the transmission optical system 4 but has the function of bending rays which travel at a distance from the optical axis and thereby cause an increase in image height, toward the peripheral portion of the DMD element 5. Such a lens element 6 is generally referred to as a "field lens". In this case, by properly setting the focal length of the lens element 6, illuminance distribution of light illuminating the DMD element 5 can be any desired illuminance distribution according to the application. Besides, no change is required to the optical elements other than the lens element 6, which dramatically reduces energy losses that would be caused by such changes and improves the efficiently of light utilization. This will be as described later.

The transmission optical system 4 and the lens element 6 are generically referred to as an optical system or lens group 20.

The light source lamp (simply referred to also as the "light source") 1 includes a phosphor 7 and an ellipsoidal mirror 8 surrounding the phosphor 7. The phosphor 7 is located in the vicinity of a first focal point of the ellipsoidal mirror 8 and emits white or monochromatic light. Light emitted from the phosphor 7 converges to around a second focal point of the ellipsoidal mirror 8 which is equivalent to a point on a light incident surface of the light mixing element 3. Here, the light source lamp 1 is not limited to the above configuration; for example, it may be configured such that a parabolic mirror is used instead of the ellipsoidal mirror 8 and generally collimated light given by reflection from the parabolic mirror converges on the light incident surface of the light mixing element 3 through a condenser lens.

The rotary color filter 2 includes color filters such as red, green, and blue. The color filter 2 rotates, for example, in synchronization with a synchronizing signal of an image signal, thereby to color a bundle of rays of illumination light in a field sequential manner. The bundle of rays colored by the rotary color filter 2 is guided into the light mixing element 3, traveling toward a to-be-illuminated or reflecting surface 5S of the DMD element 5.

The light mixing element 3 is a light-intensity leveling element for improving brightness uniformity of a focused image provided by the light source lamp 1. In general, the light mixing element 3 is configured of, for example, a rod in the shape of a square rod made of a transparent material such as glass or resin, or a pipe formed by a combination of front surface mirrors arranged in a cylindrical form. The former reflects light several times by utilizing total reflection between the transparent material and an air interface, whereas the latter reflects light several times by utilizing reflection from the front surface mirrors. Such behavior of light is based on the same principle as kaleidoscopes and if a proper length is secured, the light reflected several times by the light mixing element 3 is superimposed in the vicinity of a light exit surface 3a of the light mixing element 3, whereby a generally uniform intensity distribution can be achieved in the vicinity of the light exit surface 3a of the light mixing element 3. The light source surface 3a having such a generally uniform intensity distribution is guided into the DMD element 5 through the transmission optical system 4 described later, for illumination of the DMD element 5. For this, it is desirable that the light exit surface 3a of the light mixing element 3 be similar in shape to the to-be-illuminated surface 5S of the DMD element 5.

Figure 2:
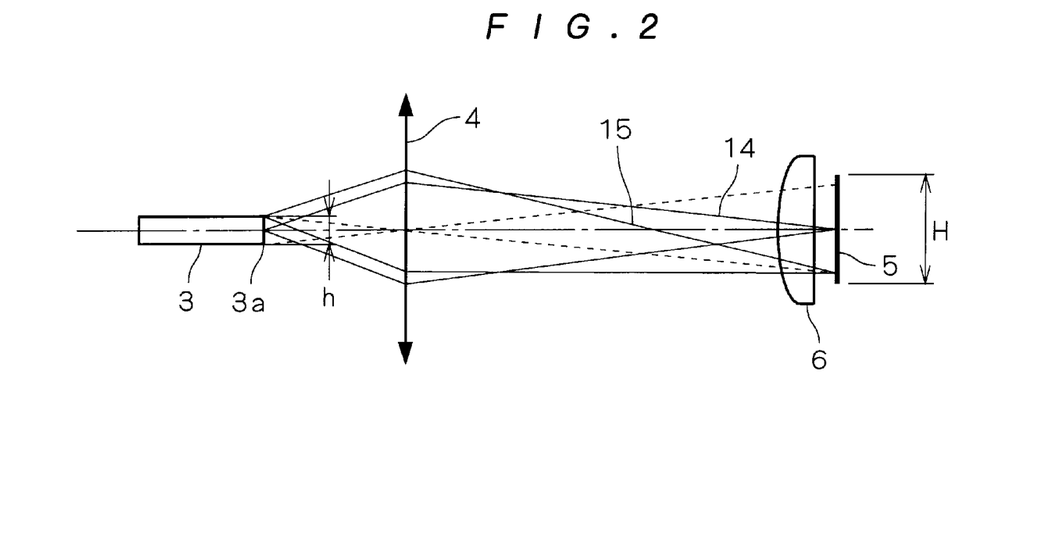
FIG. 2 shows the relationship among an optical mixing element, a transmission optical system, and a DMD element in the first preferred embodiment.

The transmission optical system 4 includes, for example, a plurality of lenses 9, 10, 11, and 12. The transmission optical system 4 brings the light exit surface 3a of the light mixing element 3 into optical conjugation with the to-be-illuminated surface 5S of the DMD element 5 and has the function of forming an image of a uniform light source surface, which is formed on the light exit surface 3a, in the vicinity of the to-be-illuminated surface 5S of the DMD element 5. FIG. 2 schematically shows the relative positions of the light mixing element 3, the transmission optical system 4 and the DMD element 5, and a relationship of imaging among them. In FIG. 2, reference character h designates a diagonal dimension of the light exit surface 3a of the light mixing element 3 and reference character H designates a diagonal dimension of a to-be-illuminated area on the to-be-illuminated surface 5S of the DMD element 5. The solid lines 14 and 15 in FIG. 2 indicate rays in schematic form. Where the image magnification of the transmission optical system 4 is designated by the letter "M", the transmission optical system 4 is designed so that the diagonal dimension h of the light exit surface 3a of the light mixing element 3 and the diagonal dimension H of the to-be-illuminated area of the DMD element 5 satisfy the condition, M≈H/h.

The DMD element 5 is a reflecting light valve formed of an array of several hundred thousands of movable micromirrors forming pixels. The tilt angle (α) of each micromirror is controlled based on the image signal. The angle controlled is a two-state value, either +α or −α. In one of the states, the micromirrors each reflect and direct incident light toward a projection optical system (not shown), whereas in the other state, they each reflect and direct incident light toward a light absorbent plate (not shown). That is, the former case achieves, in terms of images, "white" display, while the latter case achieves "black" display. In the illumination optical system according to this preferred embodiment, an object to be illuminated is not necessarily limited to the DMD element 5 and may be any other light value as long as it has a generally flat surface to be illuminated.

For more details on the DMD element 5, see the SPIE article by L. H. Hornbeck, Proc. SPIE, vol. 3013, pages 27–40 (1997), for example.

The lens element 6 is a planoconvex lens having a plane surface facing the to-be-illuminated surface 5S of the DMD element 5 and a convex surface facing the lens 12 in the transmission optical system 4. The lens element 6 functions as a "field lens" which primarily acts on the periphery of the bundle of rays of illumination light to inwardly refract peripheral rays, thereby inwardly refracting rays which are being directed outside the width of the to-be-illuminated surface 5S of the DMD element 5. At this time, the presence of the lens element 6 has little influence on image performance of the transmission optical system 4.

Figure 3:
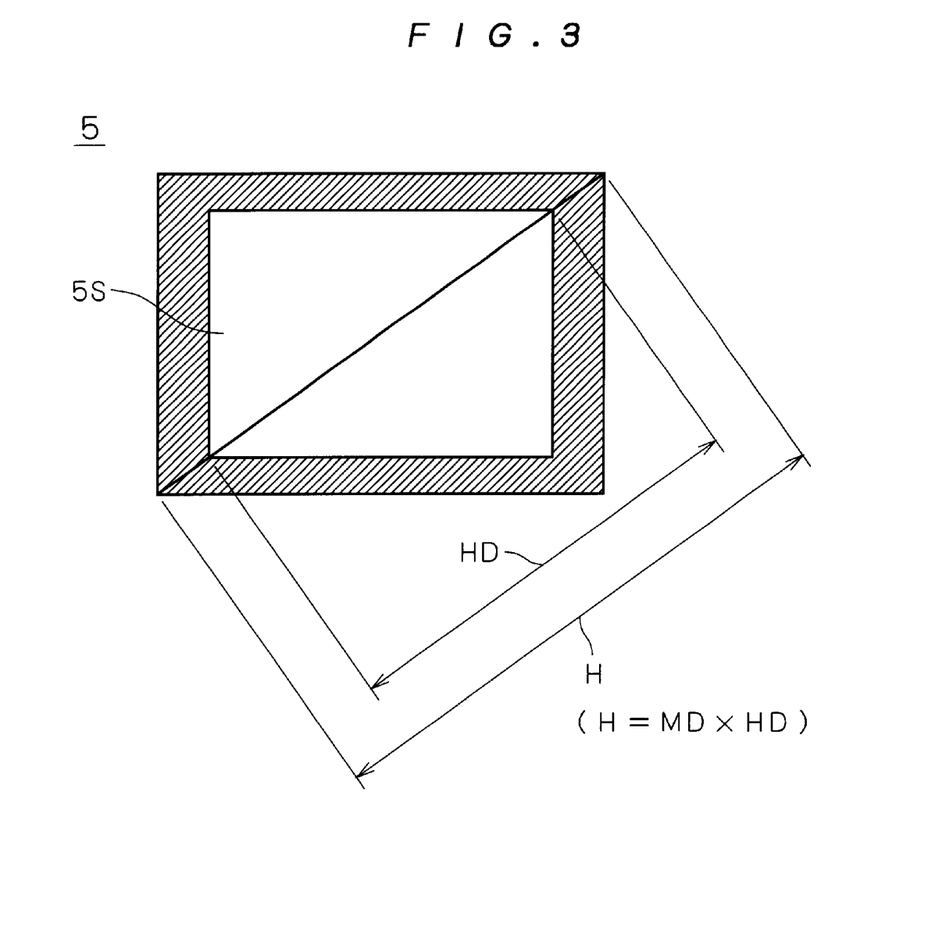
FIG. 3 shows the size of a to-be-illuminated area in the first preferred embodiment.

FIG. 3 shows the relative sizes of the to-be-illuminated surface 5S of the DMD element 5 and the to-be-illuminated area. In FIG. 3, where the dimension of the to-be-illuminated surface 5S is defined as a diagonal dimension HD (fixed value) of an effective operating area of the DMD element 5, the diagonal dimension H of the to-be-illuminated area on the to-be-illuminated surface 5S of the DMD element 5 is usually determined as H=MD×HD in consideration of an illumination margin MD. Here, the illumination margin MD is required for the purposes of avoiding underexposure in the outermost periphery caused, for example, by the optical performance of the transmission optical system 4 and allowing variations in the location of the DMD element 5 relative to the transmission optical system 4.

The illumination margin MD of the DMD element 5 varies according to applications of the optical illumination system of this preferred embodiment or the projection display. For example when the illumination optical system of this preferred embodiment is used to form a multi-screen with a plurality of screens arranged in an array, sufficiently uniform illumination is required to minimize detection of an unnatural boundary (joint) between each screen. Thus, the DMD element 5 must have a uniform illuminance distribution. At this time, it is desirable that the illumination margin MD be set to a reasonably large value, e.g., 1.09, and the diagonal dimension H of the to-be-illuminated area be set to a larger value than the diagonal dimension HD of the to-be-illuminated surface 5S of the DMD element 5.

When projected light is applied to a single screen, on the other hand, the illumination margin MD may be small: for example, it can be set to 1.00. This is because it has been known that the human eye perceives the entire screen to be brighter as illuminance in the center of the screen increases, at which time a reduction in illuminance in the periphery of the screen is allowed to some extent. In this case, if the light reaching the periphery of the screen can be turned toward the center of the screen, it becomes possible to achieve an illuminance distribution suitable for a single screen while avoiding losses of the bundle of rays of illumination light as a whole. This function is performed by the aforementioned lens element (field lens) 6.

In the illumination optical system according to this preferred embodiment, the bundle of rays of illumination light from the transmission optical system 4 is guided to the DMD element 5 after being somewhat concentrated with the lens element 6 as a field lens. A specific method of varying and determining the illumination margin MD is to change the refracting power of the lens element 6 (given by the inverse of the focal length), in other words, to change the focal length of the lens element 6, thereby changing the form of convergence of the bundle of rays. As a result, the size (diagonal dimension H) of the to-be-illuminated area and the form of distribution of the bundle of rays of illumination light are changed.

Figure 4:
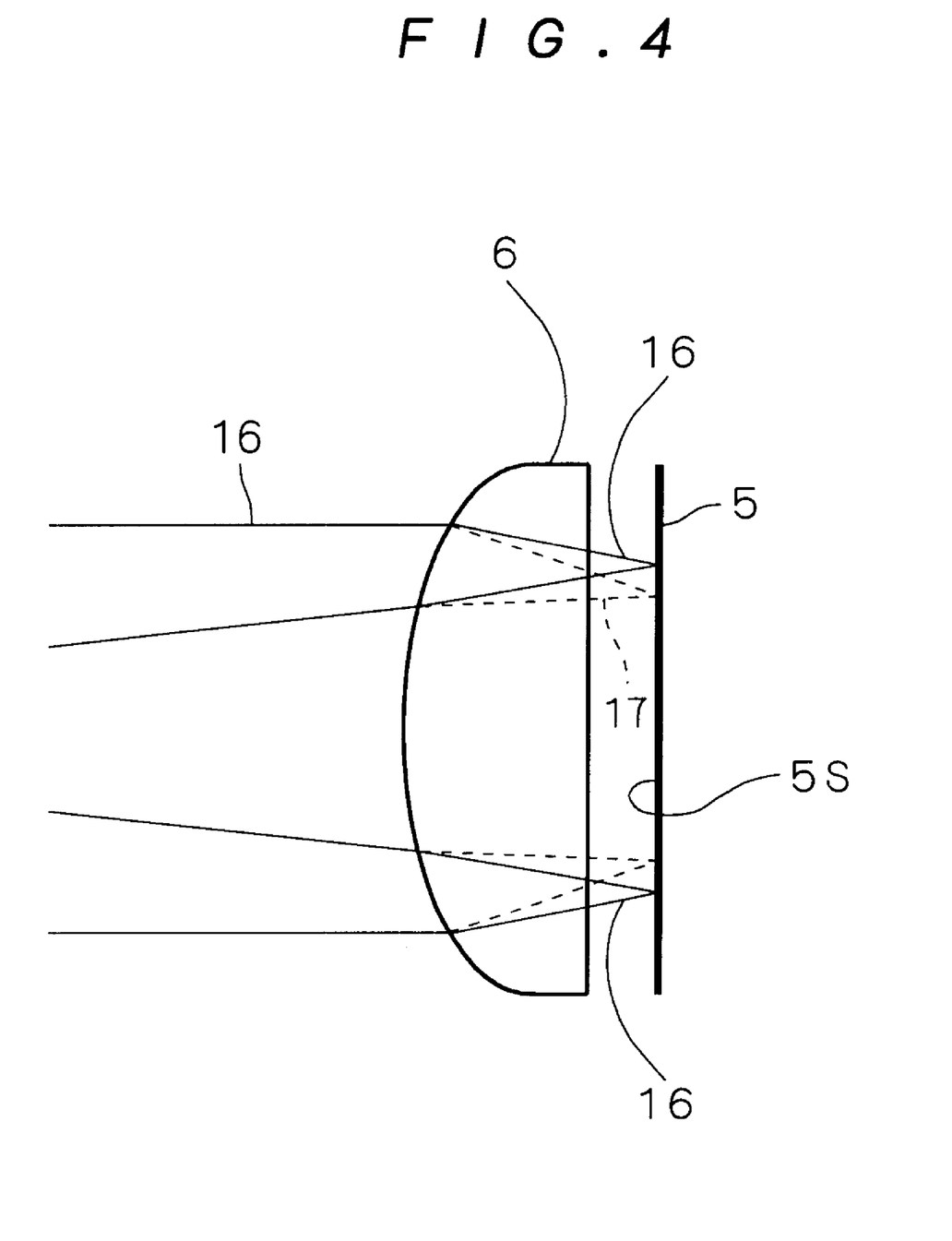
FIG. 4 schematically shows the behavior of light rays through a lens element in the first preferred embodiment.

FIG. 4 schematically shows that rays reaching the to-be-illuminated surface 5S have different optical paths depending on the refracting power (or focal length) of the lens element 6. In FIG. 4, rays 17 indicated by the dotted lines represent the behavior of light when the lens element 6 has a greater refracting power (i.e., a smaller focal length) than in the case represented by rays 16 indicated by the solid lines.

Figure 5A:
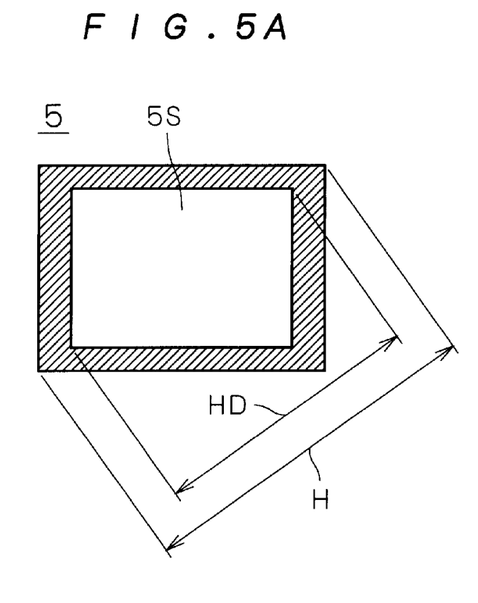
FIGS. 5A to 5D show the effects of changing the focal length of the lens element in the first preferred embodiment.
Figure 5B:
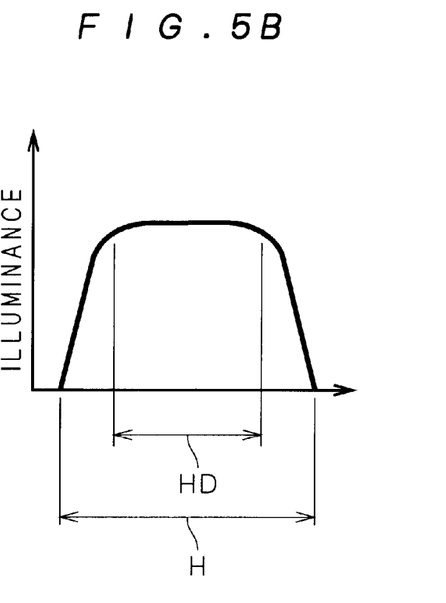

FIGS. 5A to 5D show the diagonal dimension H of the to-be-illuminated area on the DMD element 5 and the illuminance distribution on the DMD element 5, for different refracting power of the lens element 6. FIGS. 5A and 5B are for the case where the illumination margin MD is set to 1.05. The diagonal dimension H of the to-be-illuminated area at this time is given by H=1.05×HD and is greater than the diagonal dimension HD of the to-be-illuminated surface 5S of the DMD element 5. As is apparent from the illuminance distribution in FIG. 5B, sufficiently uniform illumination can be achieved on the to-be-illuminated surface 5S of the DMD element 5.

Figure 5C:
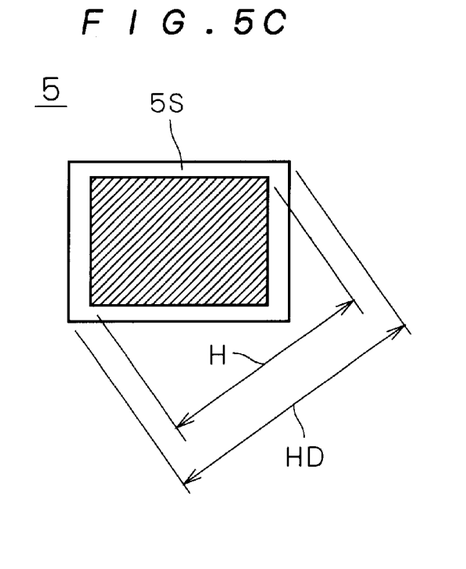
Figure 5D:
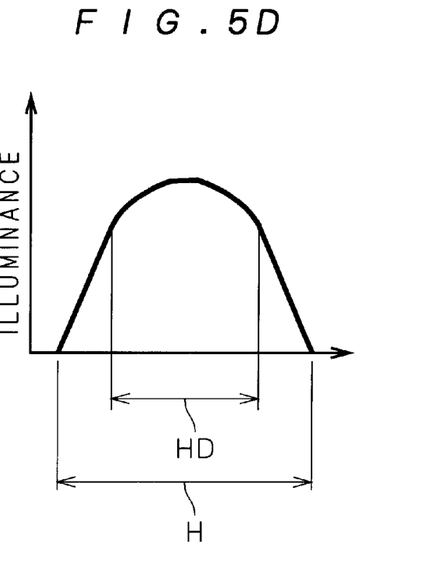

FIGS. 5C and 5D, on the other hand, are for the case where the illumination margin MD is set to 0.95. The diagonal dimension H of the to-be-illuminated area at this time is given by H=0.95×HD and is smaller than the diagonal dimension HD of the to-be-illuminated surface 5S of the DMD element 5. The illuminance distribution on the to-be-illuminated surface 5S in this case shows the effect of improving the brightness in the central portion of the to-be-illuminated surface 5S, although darkening the peripheral portion. In the case of FIGS. 5C and 5D, the focal length of the lens element 6 is smaller than that in the case of FIGS. 5A and 5B.

Now, we will consider a first numerical example of the lens element 6 according to this preferred embodiment. In the first and subsequent numerical examples, FNO is defined as the F-number of the optical system 20, M as the image magnification of the optical system 20, HD as the diagonal dimension of the DMD element 5, MD as the illumination margin, and H as the diagonal dimension of the to-be-illuminated area given by H=MD×HD. Further, R designates the radius of curvature of a first surface (convex surface) of the lens element 6, T designates the thickness of the lens element 6, and f designates the focal length of the lens element 6. Still further, nd designates the refractive index of a glass material forming the lens element 6 with respect to the d line, and vd designates the Abbe number for the glass material forming the lens element 6. Table 1 shows the results (of simulation) for the first numerical example.

TABLE 1

| FNO = 2.5, M = 2.45 | | | | | | | |
| HD = 20.26 mm, MD = 1.09, H = 22.00 mm | | | | | | | |
| R | T | f | nd | vd | Pdmd | Cdmd | Udmd |
| --- | --- | --- | --- | --- | --- | --- | --- |
| 44.10 | 10.22 | 129.15 | 1.52 | 64.20 | 0.59 | 1.00 | 97.92% |

In Table 1, Pdmd designates the percentage of light which reaches the DMD element 5 and falls within a range of effective angles, where 1 represents a bundle of rays emitted from the light source lamp 1. As the value comes closer to 1, illumination efficiency improves. The effective angles are determined by the F-number of the optical system 20. Where θ is the effective angle, it can be calculated using the following equation (1):

$$FNO = 1/(2 \times \sin θ) \qquad (1)$$

In the first numerical example, since FNO=2.5, the effective angle θ on the DMD element 5 is plus or minus 11.54°.

In Table 1, Cdmd designates the brightness in the central portion of the to-be-illuminated surface 5S of the DMD element 5. Where 1 represents the central brightness Cdmd in the first numerical example shown in Table 1, the central brightness Cdmd in other numerical examples is expressed relative to that value.

Figure 6:
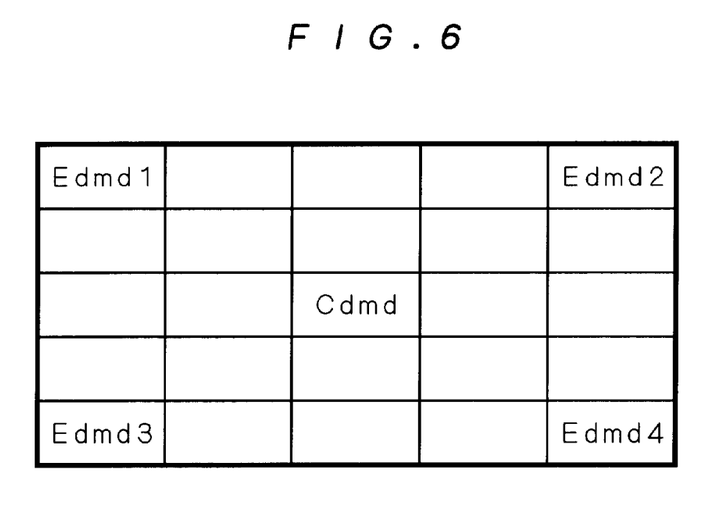
FIG. 6 shows a method of calculating uniformity on a to-be-illuminated surface in the first preferred embodiment.

Further, in Table 1, Udmd designates the degree of uniformity of the illuminance distribution on the to-be-illuminated surface 5S of the DMD element 5. This uniformity Udmd can be calculated using the following equation (2), based on illuminance distributions which are obtained by calculation after the to-be-illuminated surface 5S of the DMD element 5 is divided into a 5×5 matrix as shown in FIG. 6 on the simulation. In Equation (2), Edmd1 to Edmd4 designate illuminance in the peripheral portions of the to-be-illuminated surface 5S of the DMD element 5 as shown in FIG. 6.

$$Udmd = Cdmd/(\text{Average of } Edmd1 \text{ to } Edmd\,4) \qquad (2)$$

Figure 7:
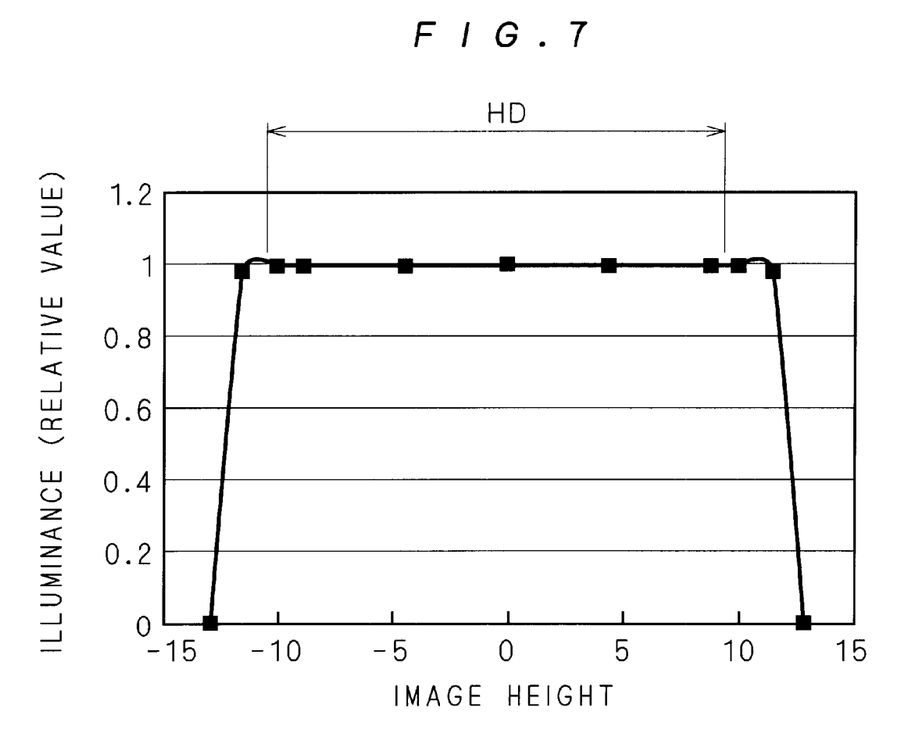
FIGS. 7 to 10 show illuminance distributions on the to-be-illuminated surface in the first preferred embodiment.

FIG. 7 shows the simulation results for illumination by the illumination optical system using the lens element 6 made to the specifications shown in Table 1. In FIG. 7, the vertical axis indicates the illuminance (relative value) and the horizontal axis indicates the image height. Here, the image height is the distance diagonally taken between the center (optical axis) of the to-be-illuminated surface 5S and the peripheral portion of the screen. FIG. 7 is a cross-sectional view showing the illuminance distribution on the to-be-illuminated area. As is apparent from FIG. 7, since the illumination margin MD is set to a large value, i.e., 1.09, sufficiently uniform illumination can be achieved on the illuminated area (the area given by the diagonal line HD) of the DMD element 5. In this numerical example, the ratio of the focal length f of the lens element 6 to the diagonal dimension HD of the DMD element 5, i.e., f/HD, becomes 6.375.

Next, we will consider a second numerical example of the lens element 6 according to this preferred embodiment. Table 2 shows the specifications of the lens element 6 and the like, and the calculated results in this case.

TABLE 2

FNO = 2.5, M = 2.45
HD = 20.26 mm, MD = 1.05, H = 21.18 mm

| R | T | f | nd | vd | Pdmd | Cdmd | Udmd |
|---|---|---|----|----|------|------|------|
| 42.23 | 10.22 | 123.68 | 1.52 | 64.20 | 0.62 | 1.06 | 95.19% |

In Table 2, the illumination margin MD is set to 1.05. The diagonal dimension H of the to-be-illuminated area is given by H=MD×HD so as to satisfy the relation between the image magnification M of the optical system 20 and the diagonal dimension h of the light exit surface 3a of the light mixing element 3, i.e., M≈H/h. Where the diagonal dimension HD of the DMD element 5 and the diagonal dimension h of the light exit surface 3a of the light mixing element 3 are set to fixed values, the diagonal dimension H of the to-be-illuminated area and the image magnification M of the optical system 20 vary with the illumination margin MD.

In the numerical example of the lens element 6 shown in Table 2, the value of the illumination margin MD is set to 1.05, which is equivalent to about 0.96 times that in the aforementioned first numerical example. The diagonal dimension H of the to-be-illuminated area and the image magnification M of the optical system 20 in the second numerical example, therefore, should be set to be approximately 0.96 times those in the first numerical example. That is, setting the focal length f of the lens element 6 to be approximately 0.96 times that in the first numerical example achieves high illumination efficiency while keeping good image performance. This also achieves the effect of reducing the diagonal dimension H of the to-be-illuminated area and the effect of increasing both the central brightness Cdmd and the light amount Pdmd of received light having an effective angle component for the DMD element 5. It, however, should be understood that, at this time, the uniformity Udmd on the DMD element 5 is degraded.

The thickness T of the lens element 6 and the type of the glass material thereof in the case of Table 2 are identical to those in first numerical example shown in Table 1; therefore, only the radius of curvature R of the lens element 6 should be changed to meet a varying focal length of the lens element 6. From this, if only the lens element 6 in the first numerical example is replaced with another lens element 6 having a different radius of curvature R, an illuminance distribution that is inferior in the uniformity Udmd to that in the first numerical example can be easily achieved on the to-be-illuminated surface 5S of the DMD element 5. This makes shareable all the optical elements other than the lens element 6 and the structural members holding the optical elements.

Figure 8:
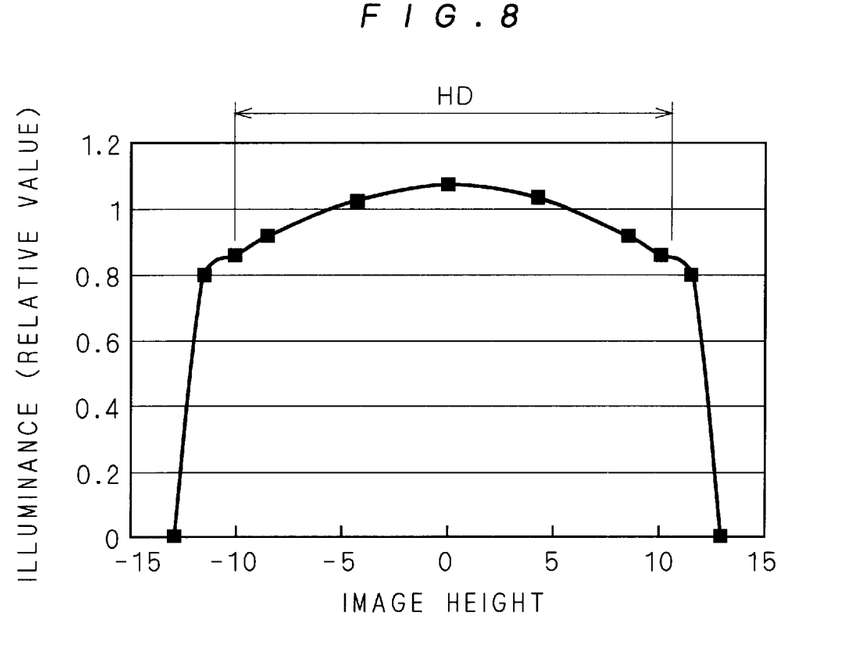

FIG. 8 shows the simulation results for the illuminance distribution on the to-be-illuminated surface 5S, using the lens element 6 made to the specifications shown in Table 2. In comparison with FIG. 7, the effects of reducing the value of the uniformity Udmd from 97.92% to 95.19%, increasing the light amount Pdmd of received light having an effective angle component from 0.59 to 0.62, and increasing the central brightness Cdmd by 1.06 times can be achieved. In this numerical example, the ratio of the focal length f of the lens element 6 to the diagonal dimension HD of the DMD element 5, i.e., f/HD, becomes 6.105.

Table 3 shows a third numerical example of the lens element 6 according to this preferred embodiment.

TABLE 3

FNO = 2.5, M = 2.45
HD = 20.26 mm, MD = 1.00, H = 20.26 mm

| R | T | f | nd | vd | Pdmd | Cdmd | Udmd |
|---|---|---|----|----|------|------|------|
| 40.22 | 10.22 | 117.72 | 1.52 | 64.20 | 0.63 | 1.12 | 82.92% |

The third numerical example shows the case where the illumination margin MD is set to 1.00, which is equivalent to approximately 0.92 times that in the first numerical example. The diagonal dimension H of the to-be-illuminated area and the image magnification M of the optical system 20 in the third numerical example, therefore, should be set to be approximately 0.92 times those in the first numerical example. That is, setting the focal length f of the lens element 6 in this case to be approximately 0.92 times that in the first numerical example achieves high illumination efficiency while keeping good image performance. The thickness T of the lens element 6 and the type of the glass material thereof in this numerical example are also identical to those in the first and second numerical examples. Therefore, if only the lens element 6 in the second numerical example is replaced with another lens element 6 having a different radius of curvature R, an illuminance distribution that is inferior in the uniformity Udmd to that in the second numerical example can be achieved with ease. This makes shareable all the optical elements other than the lens element 6 and the structural members holding the optical elements.

The radius of curvature R and the focal length f of the lens element 6 in Table 3 are smaller than those in the first and second numerical examples. This achieves the effects of further reducing the diagonal dimension H of the to-be-illuminated area and increasing both the central brightness Cdmd and the light amount Pdmd of received light having an effective angle component for the DMD element 5.

Figure 9:
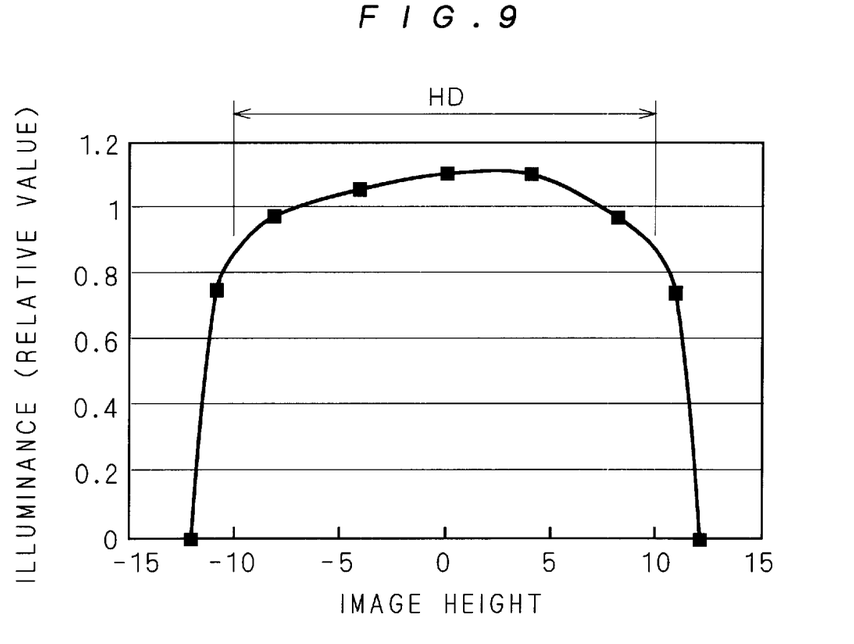

FIG. 9 shows the simulation results for the illuminance distribution on the to-be-illuminated surface 5S, using the lens element 6 made to the specifications shown in Table 3. In comparison with FIG. 8, although the value of the uniformity Udmd is further reduced to 82.92%, the effect of increasing both the central brightness Cdmd and the light amount Pdmd of received light having an effective angle component for the DMD element 5 can be achieved: more specifically, the light amount Pdmd is increased to 0.63 and the central brightness Cdmd is increased by 1.12 times that in the first numerical example. In the third numerical example, the ratio of the focal length f of the lens element 6 to the diagonal dimension HD of the DMD element 5, i.e., f/HD, becomes 5.810.

Table 4 shows a fourth numerical example of the lens element 6 according to this preferred embodiment.

TABLE 4

FNO = 2.5, M = 2.45
HD = 20.26 mm, MD = 0.95, H = 19.24 mm

| R | T | f | nd | vd | Pdmd | Cdmd | Udmd |
|---|---|---|----|----|------|------|------|
| 38.17 | 10.22 | 111.78 | 1.52 | 64.20 | 0.63 | 1.22 | 67.63% |

The fourth numerical example shows the case where the illumination margin MD is set to 0.95, which is equivalent to about 0.87 times that in the first numerical example. The diagonal dimension H of the to-be-illuminated area and the image magnification M of the optical system 20 in the fourth numerical example, therefore, should be set to be approximately 0.87 times those in the first numerical example. That is, setting the focal length f of the lens element 6 to be approximately 0.87 times that in the first numerical example achieves high illumination efficiency while keeping good image performance. In this numerical example, the thickness T of the lens element 6 and the type of the glass material thereof are also identical to those in the first through third numerical examples. Therefore, if only the lens element 6 in the third numerical example is replaced with another lens element 6 having a different radius of curvature R, an illuminance distribution that is inferior in the uniformity Udmd to that in the third numerical example can be achieved with ease. This makes shareable all the optical elements other than the lens element 6 and the structural members holding the optical elements.

The radius of curvature R and the focal length f of the lens element 6 in Table 4 are smaller than those in the first through third numerical examples. This achieves the effect of further reducing the diagonal dimension H of the to-be-illuminated area and the effect of increasing both the central brightness Cdmd and the light amount Pdmd of received light having an effective angle component for the DMD element 5.

Figure 10:
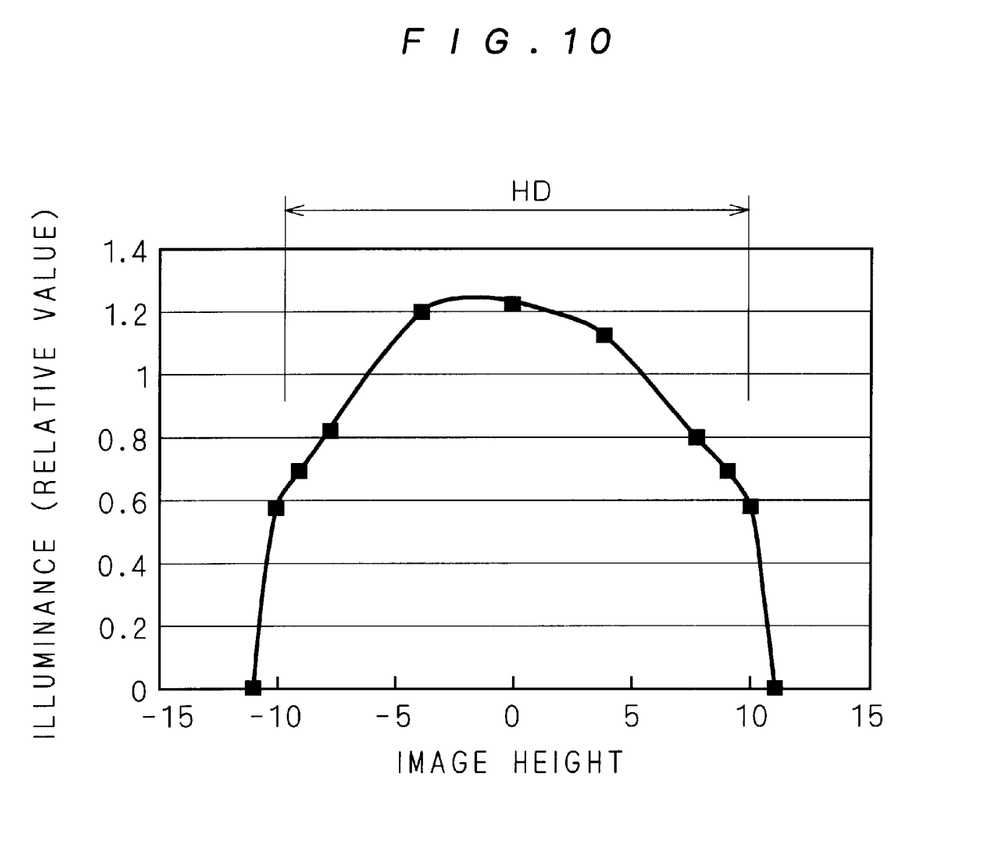

FIG. 10 shows the simulation results for the illuminance distribution on the to-be-illuminated surface 5S, using the lens element 6 made to the specifications shown in Table 4. In comparison with FIG. 9, although the value of the uniformity Udmd is further reduced to 67.63%, the light amount Pdmd of received light having an effective angle component for the DMD element 5 is equivalent and the central brightness Cdmd is further increased by 1.22 times that in the first numerical example. In the fourth numerical example, the ratio of the focal length f of the lens element 6 to the diagonal dimension HD of the DMD element 5, i.e., f/HD, becomes 5.517.

Through consideration of the above four numerical examples, the functions and effects of controlling the uniformity of illumination according to this preferred embodiment have been described. As above described, by simply changing the specifications (focal length) of the lens element 6, high brightness uniformity suitable for multi-screen display or relative brightness in the center of the screen, which is suitable for single-screen display, can be achieved. At this time, the ratio of the focal length f of the lens element 6 to the diagonal dimension HD of the DMD element 5 ranges from 5.517 to 6.375. Evaluated in the light of an actual projection display, the ratio between 5.5 and 6.5 achieves desirable image uniformity. Of course, this preferred embodiment is not limited to the above numerical examples, and it goes without saying that the present invention also includes other specifications of the lens element 6 that achieve similar effects.

Modification

While the method of changing the radius of curvature R of the lens element 6 thereby to vary the focal length f thereof has been described in this preferred embodiment, the method of varying the focal length f is not necessarily limited thereto. For example, the focal length f of the lens element 6 may be varied by changing the type of the glass material forming the lens element 6. In short, the focal length f of the lens element 6 should be varied by changing at least one of the radius of curvature R and the type of the glass material. It is, however, to be noted that a method of changing the thickness T of the lens element 6 should be avoided because, in this case, changes are required not only to the specification of the lens element 6 but also to the specifications of other optical elements.

While the light mixing element 3 in this preferred embodiment is formed in the shape of a square rod, it may be formed by bending a thin-plate reflector so as to obtain a hollow rod. For the light mixing element 3 in the shape of a hollow rod, a point at which light can be concentrated at high energy densities can be formed in inner space. This allows easy cooling of the light mixing element 3 and simplifies the way of holding the light mixing element 3 since the reflecting properties of the inner wall is not affected even if the outer wall of the light mixing element 3 is used for retention thereof. This reduces the manufacturing cost of the device.

While the rotary color filter 2 in this preferred embodiment is located immediately in front of the light mixing element 3, it may be located immediately behind the light mixing element 3. In either case, the diameter of the bundle of rays passing through the rotary color filter 2 can be reduced, which allows the configuration of a compact, light-efficient device.

While the lens element 6 in this preferred embodiment is a planoconvex lens having a plane surface facing the DMD element 5, it may have at least one aspherical surface. That is, the lens element 6 may have an aspherical surface on the side of the transmission optical system 4 and a plane or spherical surface on the side of the DMD element 5 or it may have an aspherical surface on the side of the DMD element 5 and a plane or spherical surface on the side of the transmission optical system 4. Alternatively, the lens element 6 may have aspherical surfaces on both sides of the transmission optical system 4 and the DMD element 5 (a lens element 6A shown in FIG. 11 has an aspherical surface on the side of the transmission optical system 4 and a plane surface on the side of the DMD element 5). Such an aspherical lens can be expressed by the following equation (3):

$$Z = cY^2/\{1-(1+K)c^2Y^2\}^{1/2} + AY^4 + BY^6 + CY^8 + DY^{10} \quad (3)$$

where Z is the distance in the direction along the optical axis, Y is the distance in the direction normal to the optical axis, c is the curvature at the center of the lens, A is the fourth-order coefficient of an aspherical polynomial, B is the sixth-order coefficient, C is the eighth-order coefficient, D is the tenth-order coefficient, and K is the conic constant.

Figure 12:
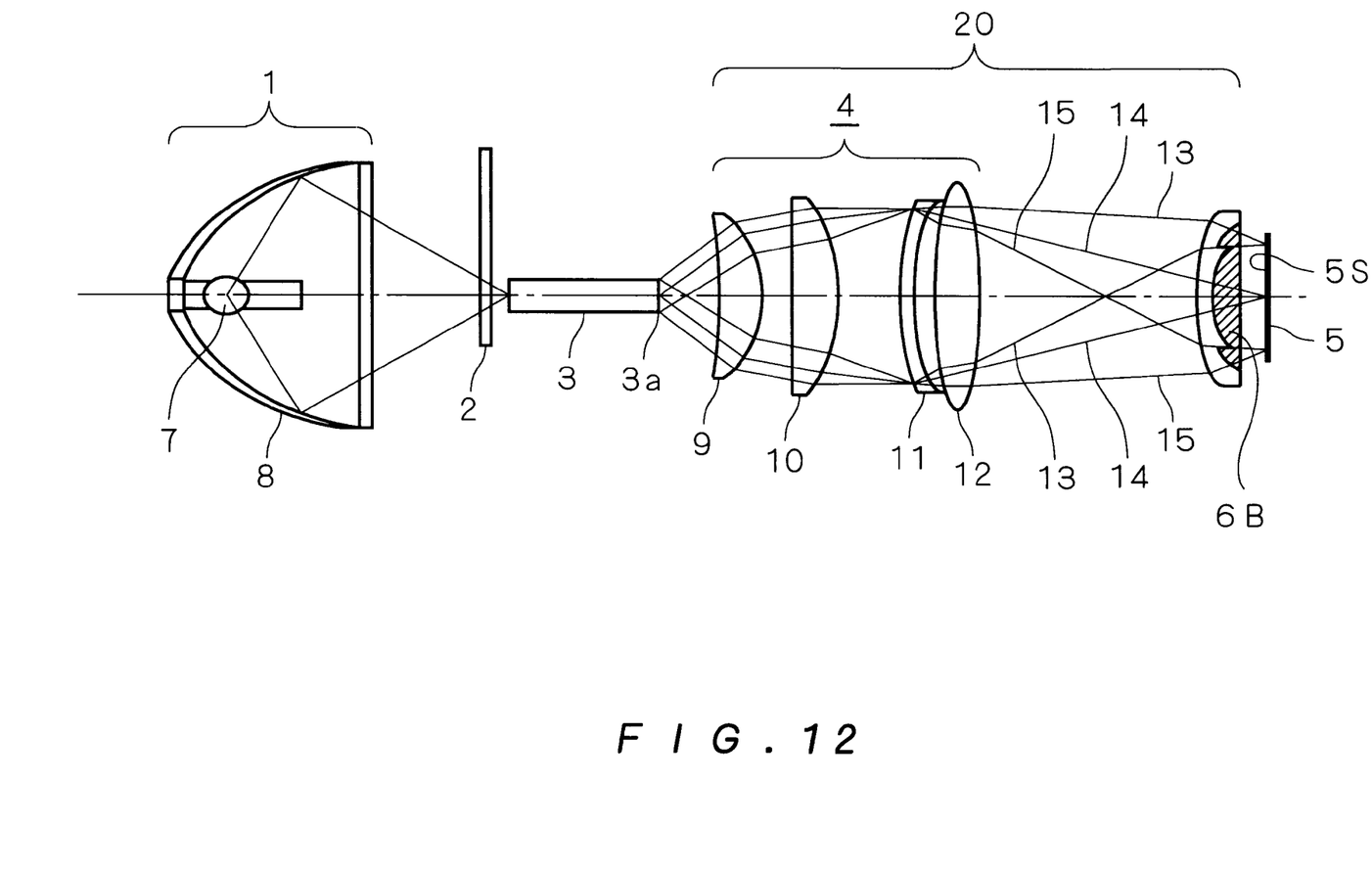
FIG. 12 shows a configuration of an illumination optical system according to another modification of the first preferred embodiment.

In another alternative, the lens element 6 may be configured of a Fresnel lens having a plane surface facing the DMD element 5 (see a lens element 6B shown in FIG. 12). Or, the lens element 6 may be configured of a Fresnel lens having a plane surface facing the transmission optical system 4.

The lens element 6 configured of an aspherical or a Fresnel lens brings the advantages of not only extending the range of choices of design parameters thereby to facilitate aberration correction, but also allowing the configuration of a lightweight device through a reduction in the thickness of the lens element 6.

Second Preferred Embodiment

Figure 13:
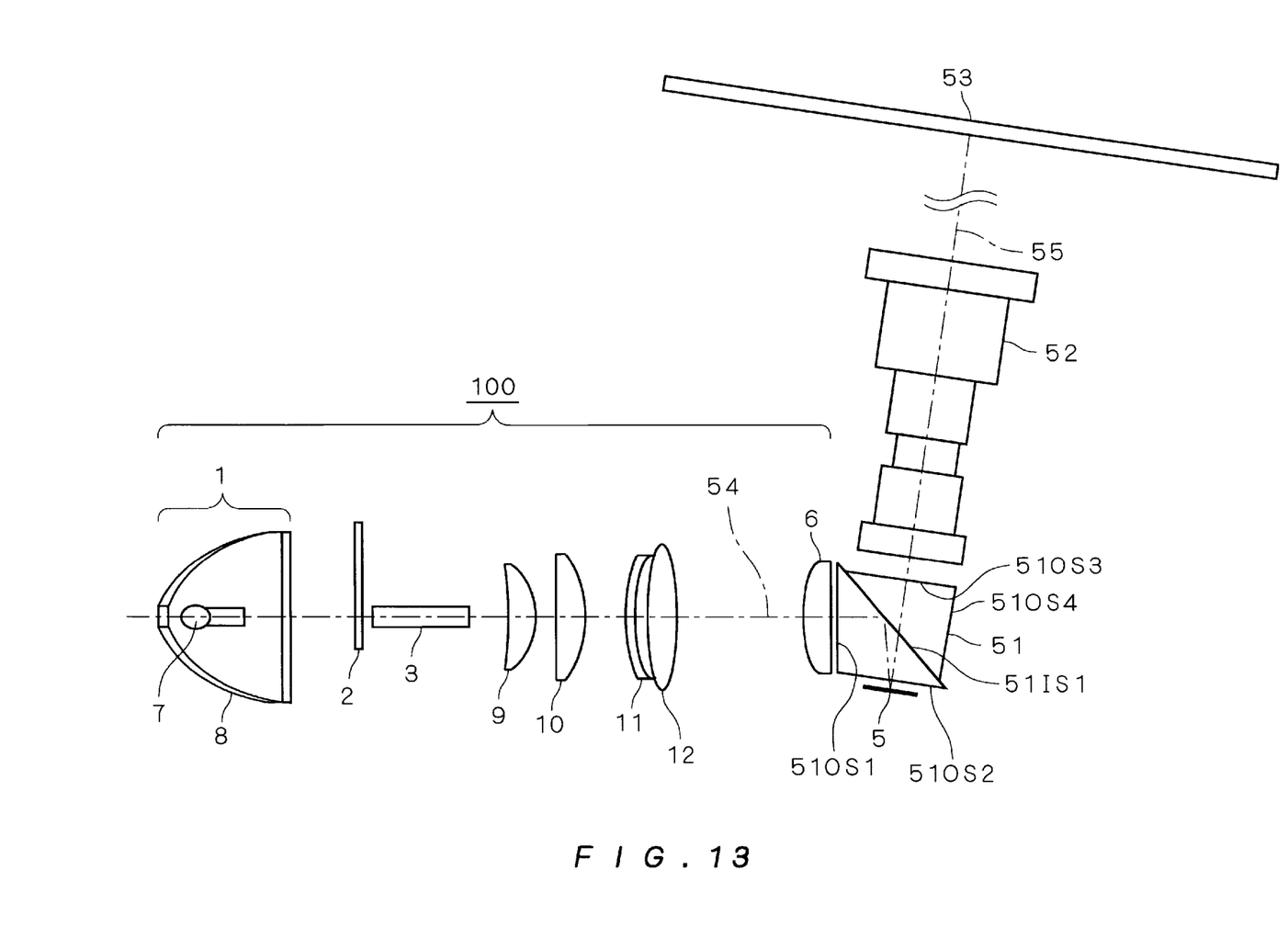
FIG. 13 shows a configuration of a projection display according to a second preferred embodiment.

FIG. 13 shows an optical system in a single-plate projector (comprising a single reflecting light valve) as an example of a projection display according to the present invention. In FIG. 13, reference numeral 51 designates a prism, reference numeral 52 designates a projection lens system as a projection optical system, and reference numeral 53 designates a screen. The other reference numerals designate identical components to those shown in FIG. 1 and thus the descriptions thereof will be omitted.

In FIG. 13, reference numeral 100 designates the illumination optical system described in the first preferred embodiment and other components are those which are added for the configuration of this projector. The sequence of operations from the light source 1 to the DMD element 5 is identical to that described in the first preferred embodiment.

In the optical path of the illumination optical system 100, the prism 51 is located between the DMD element 5 and the lens element 6. The prism 51 comprises (1) a light incident surface (first outer surface) 51OS1 perpendicular to an optical axis of illumination 54; (2) a second outer surface 51OS2 which is parallel to the optical surface of the DMD element 5 (a main surface when none of the micromirrors forming the DMD element 5 change their surface positions) and which is perpendicular to an optical axis of projection 55; (3) a light exit surface (third outer surface) 51OS3 which is parallel to the optical surface of the DMD element 5 and perpendicular to the optical axis of projection 55 and which faces the second outer surface 51OS2; (4) a fourth outer surface 51OS4 having a light absorbent plate (not shown) located thereon; and (5) an inner surface 51IS1 having the functions of totally reflecting a bundle of rays of illumination light entering from the light incident surface 51OS1 and transmitting only ON reflected light (projected light) toward the third outer surface 51OS3, the ON reflected light being obtained in such a manner that, out of a bundle of rays of illumination light transmitted through the second outer surface 51OS2, rays incident on the micromirror surfaces of the DMD element 5 to which an ON signal (white display signal) is applied are reflected by those micromirror surfaces. Thus, the prism 51 uses total reflection of the inner surface 51IS1 for deflection of illuminating rays (bending of rays toward the DMD element 5).

The prism 51 has the functions of uniting the optical performance of the illumination optical system 100 and the projection performance of the projection lens system 52 and separating the optical axis of illumination 54 and the optical axis of projection 55 in order to avoid physical interference of optical systems around the DMD element 5 (this function is referred to as an optical-path separating function).

The illumination optical system 100, as has been described in the first preferred embodiment, by simply changing only the focal length of the lens element 6 according to the application of the device, can achieve both (i) a uniform illuminance distribution and (ii) a non-uniform illuminance distribution with the central portion and the peripheral portion having different illuminance, on the to-be-illuminated surface without reducing the efficiency of light utilization. That is, the illumination optical system 100 can provide any desired illuminance distribution according to the application of the device, i.e., according to circumstances. Thus, the application of the illumination optical system 100 in the projector of this preferred embodiment allows the configuration of a compact, low-cost optical system that is capable of achieving an illuminance distribution for each purpose on the screen 53 while improving the efficiency of light utilization. The configuration of such an optical system is independent of the type of a display system such as front projection or rear projection.

Figure 11:
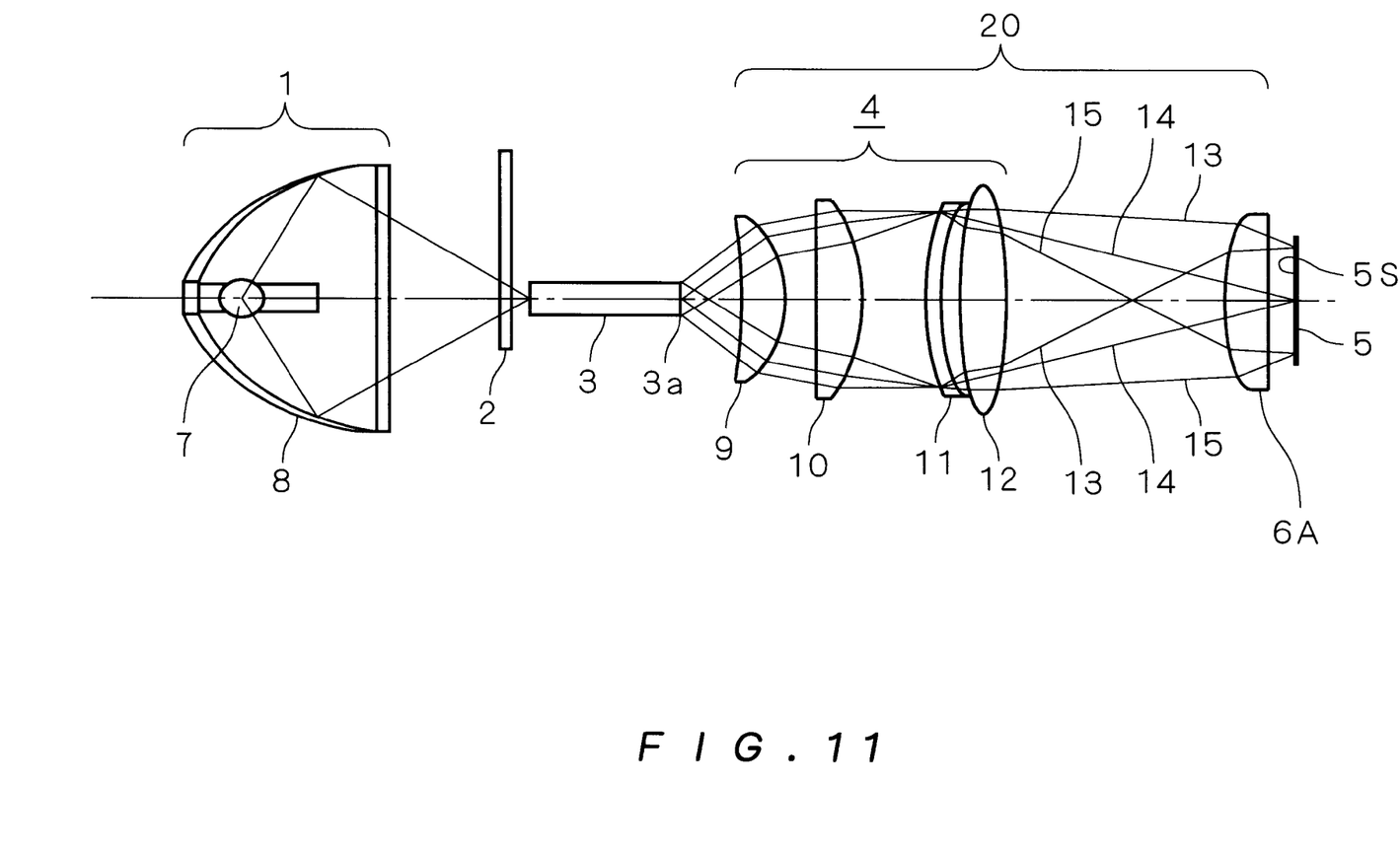
FIG. 11 shows a configuration of an illumination optical system according to a modification of the first preferred embodiment.

Of course, the configuration of this illumination optical system 100 is not limited to those shown in FIGS. 1, 11, and 12. For example, a small-sized, lightweight projector may be achieved by bending the optical path of the illumination optical system 100 through the use of an additional reflecting mirror or the like provided in the illumination optical system 100, thereby to make the arrangement of the components compact.

Here, it should be noted parenthetically that the prism 51 is not necessarily required in the configuration.

Addendum

While the present invention has been described in the above two preferred embodiments, the foregoing description is in all aspects illustrative and not restrictive. It is, therefore, to be understood that the present invention is not limited to the above two preferred embodiments and various changes and modifications can be made therein without departing from the sprit and scope of the present invention.

What is claimed is:

1. An illumination optical system comprising:
   a light source;
   a light mixing element mixing light emitted from said light source;
   a reflecting light valve having a plurality of pixels;
   a transmission optical system located between said light mixing element and said reflecting light valve and bringing a light exit surface of said light mixing element into optical conjugation with a to-be-illuminated surface of said reflecting light valve; and
   a field lens located between said transmission optical system and said reflecting light valve,
   wherein a focal length of said field lens is determined so that an illuminance distribution which varies according to the application of said illumination optical system can be achieved on said to-be-illuminated surface.

2. The illumination optical system according to claim 1, wherein
   said focal length of said field lens is determined so that an illumination margin takes on a value in the neighborhood of 1.0, and
   a diagonal dimension of a to-be-illuminated area on said to-be-illuminated surface is equivalent to the product of a diagonal dimension of said to-be-illuminated surface and said illumination margin.

3. The illumination optical system according to claim 1, wherein
   said focal length of said field lens is determined by obtaining at least one of a radius of curvature of said field lens and the type of a glass material forming said field lens on the basis of said illuminance distribution which varies according to said application of said illumination optical system.

4. The illumination optical system according to claim 1, wherein
   said light exit surface of said light mixing element and said to-be-illuminated surface of said reflecting light valve are generally similar in shape.

5. The illumination optical system according to claim 1, wherein
said plurality of pixels in said reflecting light valve each are configured of a micromirror having a variable angle of inclination.

6. The illumination optical system according to claim 1, wherein
said light mixing element is formed in the shape of a hollow rod, using its inner surface as a reflecting surface.

7. The illumination optical system according to claim 1, further comprising:
a rotary color filter located either in front of or behind said light mixing element to pass said light emitted from said light source.

8. The illumination optical system according to claim 1, wherein
said field lens is a planoconvex lens having a plane surface on the side of said to-be-illuminated surface of said reflecting light valve.

9. The illumination optical system according to claim 1, wherein
said field lens has at least one aspherical surface.

10. The illumination optical system according to claim 1, wherein
said field lens is a Fresnel lens.

11. A projection display comprising:
the illumination optical system of claim 1;
a screen; and
a projection lens system located between said reflecting light valve and said screen.

* * * * *